July 10, 1928.                                                                 1,677,025
A. G. GRIER
COMPENSATED METER
Filed Dec. 8, 1925
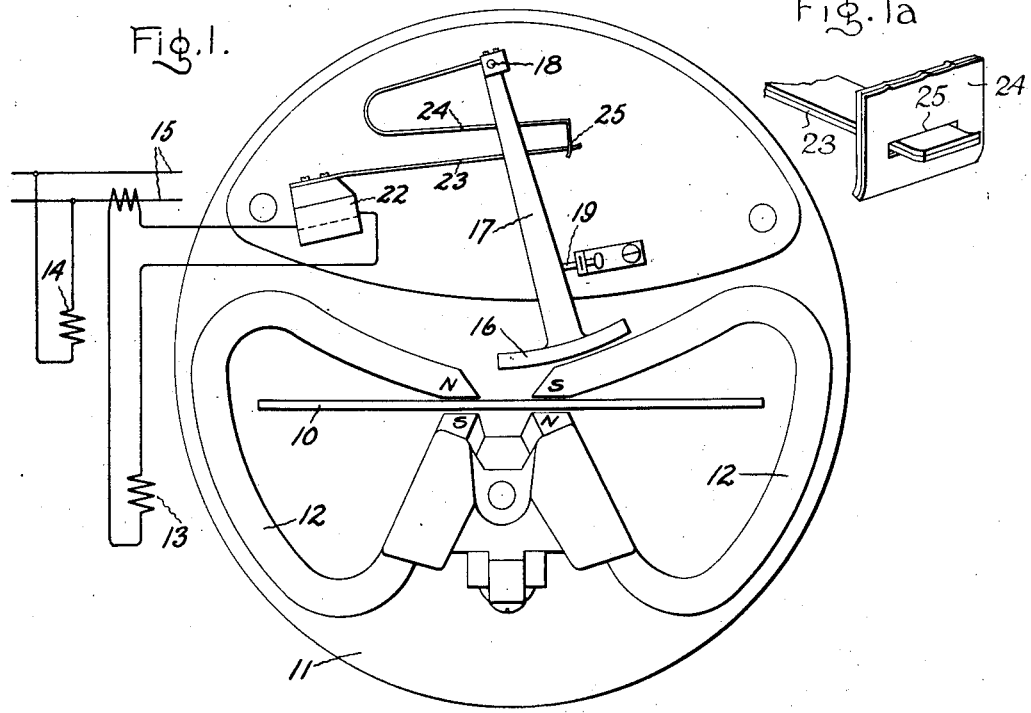
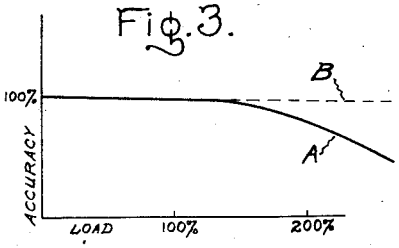
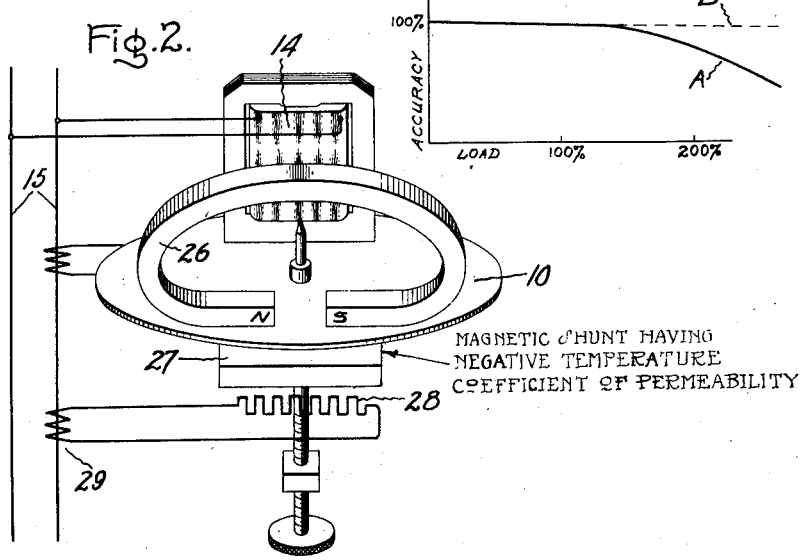
Inventor:
Arthur G. Grier;
by
His Attorney.

Patented July 10, 1928.

1,677,025

UNITED STATES PATENT OFFICE.

ARTHUR G. GRIER, OF PETERBORO, CANADA, ASSIGNOR TO GENERAL ELECTRIC COMPANY, A CORPORATION OF NEW YORK.

COMPENSATED METER.

Application filed December 8, 1925. Serial No. 74,178.

My invention relates to the overload compensation of electric meters and its purpose is to improve the accuracy of meters when subjected to overload conditions.

It is generally known that the active magnetic flux from the current coil or coils of the induction disc type watthour meter produces a retarding torque on the disc as well as cooperating with the potential flux to produce a driving torque on the disc. The driving torque increases as the first power of the current flux and predominates to such an extent over the retarding influence of this flux that up to about 125 per cent of the normal rating of the meter the retarding effect does not seriously interfere with the accuracy of the meter. However, the retarding effect of the current flux increases as the square of the current so that it becomes sufficiently large above 125 per cent normal load as to perceptibly slow down the meter. The examination of the load characteristic curve of the average induction disc watthour meter shows that the curve drops rapidly at 200 per cent load and above. Although the average induction meter will carry overloads of 300 per cent with safety, it is usually not considered good practice to operate them for any length of time at loads much above 125 per cent normal due to the loss in revenue resulting from the meter running slow above this point. My invention relates to a method and means of compensating for overload errors of induction meters so that they can be operated at higher loads without the resulting loss in revenue.

In carrying my invention into effect I provide temperature responsive means influenced by overload conditions for reducing the meter damping during overloads to such an extent as to make the meter speed substantially proportional to the load.

The features of my invention which are believed to be novel and patentable will be pointed out in the claims appended hereto. For a better understanding of my invention reference is made in the following description to the accompanying drawings, Fig. 1 of which represents a modification of my invention employing an adjustable shunt for the damping magnet system of a meter, the shunt being moved to shunt more or less of the damping flux in response to a temperature responsive member heated by the meter load current; Fig. 1ª illustrates the nature of the connection between members 23 and 24, Fig. 1; Fig. 2 represents a modification where the damping flux is varied in response to changes in permeability of a portion of the damping magnetic system which has a negative temperature coefficient of permeability; and Fig. 3 represents comparative load curves of an induction meter with and without over load compensation.

Referring to Fig. 1 of the drawing, 10 represents the rotary disc secondary of an induction watthour meter, 11 is a supporting plate of the meter from which the usual damping magnet system 12 for the disc 10 is supported. The current and potential coils of the meter are diagrammatically represented at 13 and 14 respectively and they are connected in the usual manner with the circuit 15 to be metered. 16 represents a magnetic shunt secured to an arm 17 which is pivoted at 18. The shunt is represented in the normal load position and this position may be adjusted by the adjustable stop 19. In the position represented the shunt 16 will have a negligible influence on the damping magnet system but if it is moved gradually to the left from the position shown it will shunt more and more of the flux of the permanent magnets between the upper $n$ and $s$ poles and less will pass through the disc 10, thereby decreasing the damping. Temperature responsive means heated by the load current is provided to rotate arm 17 to the left about its pivot 18 so as to decrease the effective damping flux of the meter in proportion to overloads. For this purpose I provide a heating element 22 through which the load current or a proportional part thereof is conducted as by connecting the heating element in series with the current coil of the meter as represented. Secured to and in good heat conducting relation with heating element 22 is a bimetallic spring 23 and secured to the upper end of arm 17 is a second spring with its free end slidably engaging the temperature responsive spring 23 by means of a knife edge joint at 25 formed by passing spring 23 through a slit in spring 24. When a predetermined overload current flows through the circuit including the heating element 22, spring 23 will be heated and deflected downward, thereby rotating spring 24 and arm 17 about pivot point 18, and moving shunt 16 to the left. The purpose of spring 24 is to compensate the device for ordinary room temperature changes not caused by overload conditions. Thus if the deflection of spring 23 is caused by normal heating conditions spring 24 will be deflected downward to the same extent and there will be no movement of arm 17. But if spring 23 is deflected to a greater extent due to overload conditions the arm 17 will be moved. The overload at which arm 17 starts to move and its law of movement at higher overloads may be adjusted by the zero stop 19, the initial positions of the springs and the heating influence of element 22. The ordinary induction watthour meter has an accuracy varying with load as represented by the full line curve A of Fig. 3. At about 125 per cent load the meter starts to operate too slowly and becomes less accurate as the load increases. By my invention the damping of the meter at these overloads is decreased in the manner described without interfering with the driving torque in any way so that the accuracy of the meter becomes substantially 100 per cent as represented by the dotted line B of Fig. 3.

In Fig. 2 I have shown another arrangement for accomplishing the same result. In this figure reference characters 10, 14 and 15 have the same significance as in Fig. 1. The current coil and its core being beneath the disc are not shown. The damping magnet system comprises the permanent magnet 26 above the disc and the magnetic bar 27 beneath the disc. In this case the damping flux passes from one pole of the permanent magnet 26 through the disc to the bar 27, then back through the disc to the other pole of the permanent magnet. The damping flux may be varied by adjusting the bar 27 toward and away from the disc. In order to make the damping flux vary with the load current I make all or a portion of the bar 27 of a material having a negative temperature coefficient of permeability. An alloy containing approximately 28% nickel, 69% copper and 3% iron has this property and has been used to compensate for ordinary temperature errors in the manner described in application Serial No. 711,023, filed May 5, 1924, to Isaac F. Kinnard. This bar is arranged to be heated by a resistance 28 supplied from a current transformer 29 connected in the meter load circuit 15. Since this resistance is supplied from a current transformer 29 the current flowing therein will be proportioinal to the load current irrespective of changes in the resistance value of 29 which may be due to changes in temperature. Thus even though the resistance 29 be made of a material having a positive temperature coefficient of resistance its heating effect will increase with load current because the characteristics of a current transformer are such as to maintain substantially a constant current transformer ratio irrespective of changes in the secondary burden. The thermal characteristics of member 27 are so proportioned as to decrease the permeability of member 27 as an overload comes on the meter, thereby decreasing the damping flux passing through the disc in an amount to compensate for the increasing damping influence of the current flux of the meter.

In those rare cases where the voltage of the metered circuit fluctuates considerably it may happen that the potential flux of the meter will increase to such an extent as to produce an erroneous damping influence at excessive voltage. My invention is equally applicable to correct for such conditions simply by making the heating of the elements 22 and 28 in Figs. 1 and 2 respectively responsive to excessive voltages. The invention is not limited to induction type watthour meters but may be applied for example to induction reactive component meters.

In accordance with the provisions of the patent statutes I have described the principle of operation of my invention together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. An induction type watthour meter having a tendency to run too slowly when subjected to an overload current, and means responsive to such overload current for decreasing the damping of said meter to compensate for such tendency.

2. An integrating electric meter of the induction type having damping means for the rotary element of said meter, and means responsive only to overload conditions on said meter for decreasing the damping of said meter.

3. The method of compensating integrating type induction meters for the damping error produced by overload flux conditions of the driving electromagnet which consists in decreasing the damping of said meter in proportion to such conditions.

4. An induction type meter having damping means and thermal means responsive to the load current of said meter for decreasing the damping influence of said damping means when the load current is above a predetermined value.

5. An integrating type induction meter having permanent magnet damping means, a driving electromagnet which produces a damping flux under overload conditions tending to make the meter run too slow and means responsive to the current producing such flux for decreasing the permanent magnet meter damping in proportion to the damping effect of said flux.

6. An integrating type induction meter having the usual damping and driving magnet systems, the driving magnet system having a coil traversed by the load current which produces a damping flux under overload conditions tending to make the meter run too slow, a heating element traversed by the load current, and thermal responsive means influenced by said heating element for varying the usual damping flux of said meter in a manner to compensate for the tendency for said meter to run too slow under overload conditions.

7. An integrating type induction meter having damping means, a temperature responsive element, means for heating said element in proportion to a load condition of said meter, a second temperature responsive element responsive to room temperatures only, and means controlled jointly by said two temperature responsive elements for varying the damping of said meter in response to the aforesaid load condition.

8. A meter, a temperature responsive element responsive to load conditions of said meter, a temperature responsive means responsive to room temperature only, means controlled jointly by said two temperature responsive means for varying the operation of said meter, and means for rendering said temperature responsive means inactive to control the operation of said meter under certain load conditions.

9. An integrating type induction meter having damping means, a temperature responsive element responsive to the load current of said meter, a temperature responsive means responsive to room temperature only, means controlled jointly by said temperature responsive means for decreasing the damping of said meter with increase in load current, and means for rendering said temperature responsive means inoperative to vary the damping of the meter when the load current is below a predetermined amount.

10. An integrating type induction meter having a damping magnet system, means for shunting an adjustable portion of the flux of said system away from the damping path comprising a magnetic shunt arranged to be moved toward and away from a position where it will vary the effective damping flux of the meter, and temperature responsive means compensated for changes in room temperature for moving said shunt in response to predetermined overload conditions on said meter.

In witness whereof I have hereunto set my hand this third day of December, 1925.

ARTHUR G. GRIER.